United States Patent [19]

Bogner

[11] Patent Number: 4,843,483
[45] Date of Patent: Jun. 27, 1989

[54] METHOD FOR THE SIMULTANEOUS DEPICTION OF AT LEAST TWO TEMPORALLY SEQUENTIAL EVENTS ON TELEVISION, AND EQUIPMENT FOR IMPLEMENTING THIS METHOD

[76] Inventor: Willy Bogner, Sankt-Veit-Strasse 4, D-800 Munich 80, Fed. Rep. of Germany

[21] Appl. No.: 68,058

[22] Filed: Jun. 30, 1987

[30] Foreign Application Priority Data

Jul. 5, 1986 [DE] Fed. Rep. of Germany ....... 3622618

[51] Int. Cl.[4] ............................................... H04N 5/76
[52] U.S. Cl. ...................................... 358/335; 358/22; 360/10.1; 360/14.1
[58] Field of Search ................. 358/22, 105, 183, 335, 358/213.26; 360/10.1–10.3, 14.1–14.3, 33.1

[56] References Cited

U.S. PATENT DOCUMENTS 4,516,166  5/1985  Tellone ........................ 360/14.3 X
4,743,971  5/1988  Hügli ............................. 358/213.26
4,774,582  9/1988  Hakamada et al. ............... 358/22 X

OTHER PUBLICATIONS

Ein Fernsehgerät für Mehrere Videosignale published in Funk-Technik, vol. 40 (1985), No. 10, pp. 409,410.

*Primary Examiner*—L. T. Hix
*Assistant Examiner*—D. Rutledge
*Attorney, Agent, or Firm*—Browdy & Neimark

[57] ABSTRACT

A method for simultaneous depiction of at least two temporally sequential events, particularly sports events in the form of racing or jumping, on adjoining picture surfaces such as of at least one picture screen, with at least sections of the events being stored, via a video device, in at least one picture memory. Thus sports events of the type described above can be organized in a more interesting and expressive manner for television viewers, and sportspersons and managers are given the possibility of comparing, as soon and as exactly as possible, individual races and jumps, etc. This is achieved by showing simultaneously with the direct showing and/or broadcasting of the live event at least one additional event of the same type, which is pre-stored in the picture memory, synchronously and/or spatially in parallel with the live event.

20 Claims, 1 Drawing Sheet

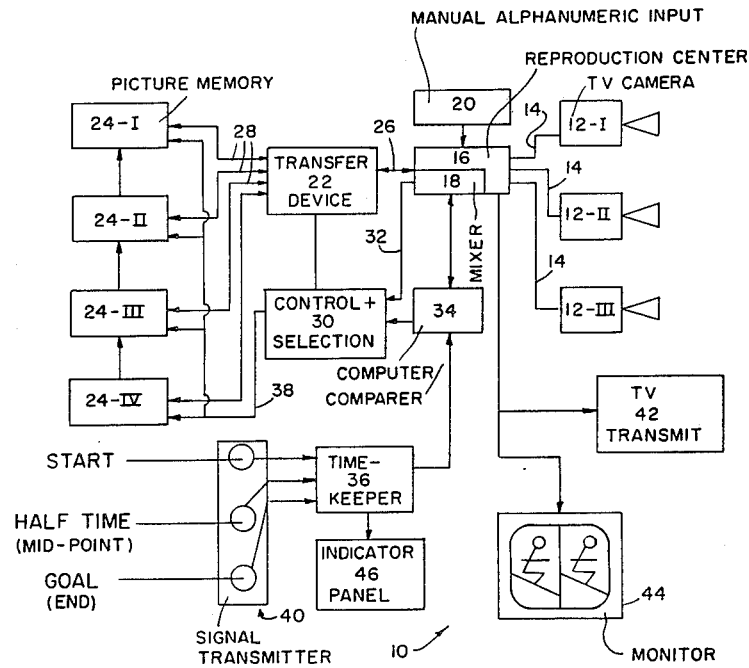

the illustration of FIG. 2, the pixels 68 are shown as relatively large squares spaced substantially from each other solely in the interest of providing a graphic representation of the pattern in which they are arranged. It will be understood that in actual practice, the size of the individual pixels 68 will be much smaller and the spacing between the pixels much closer than that illustrated in FIG. 2 in order to produce a high resolution reproduction of the image presented to the CCD 54 by the lens 56.

In the pixel pattern of the present invention, the pixels 68 are arranged in a succession of curved rows 70, the curvature of each row being geometrically proportional to the curve defined by each record track 18 developed by the rotary printer apparatus of FIGS. 3 and 4. As a result of this pattern, the physical location of image increment defining light rays passing through the lens 56 to each pixel 68 will correspond directly to the physical location of a printed replica of that image increment on the card 10. Thus, upon conversion of each image increment to an analog voltage value by each pixel 68 and the serial transfer of that voltage value from the respective pixels in each row 70 by the CCD timing circuit 62 through the signal processing circuitry 60, 64 and 66 (FIG. 3) to the laser 20, the printed image increment represented by each record track 18 on the card 10 will be a faithful reproduction of the lens produced image increment seen by each row 70 of pixels 68.

As shown in FIG. 2, the effective image receiving area of the CCD 54 is delimited by a dashed line frame 72 which is smaller than the overall pixel array. This allows for the first several (e.g. 6-10) of the pixels 68 in each row 70 to be masked to provide a black or dark current reference value during signal transfer and processing a manner well known in the art.

In the pattern illustrated in FIG. 2, the pixels 68 are arranged to lie on straight lines 74 in a direction generally perpendicular to the curved rows 70. While this arrangement may be preferred for an assortment of reasons, such as ease of assembly of CCD or the like, it is not critical to practice of the invention inasmuch as the serial transfer of voltage values from the pixels 68 along each of the curved rows 70 to provide a corresponding record track 18 on the printed media of the card 10 would not require that the spacing of pixels be the same in each of the rows 70. In other words, it may be desirable from the standpoint of achieving a more dense pixel pattern to arrange the pixels in other than a linear orientation in a direction transverse to the curved rows 70.

As described in the above-mentioned U.S. Pat. No. 4,663,518, the multi-layer media of the card 10 is capable of recording full color images by focusing the modulated light energy passing the printer lenses 40 to different focal plane depths in the media which correspond to the separate layers of the media. Detection of color tones in the image passing the lens 56 to the CCD 54 may be accomplished in several ways, for example, the pixels 68 in the rows 70 may be alternately sensitive to red, green and blue frequencies of light in the image so that the composite of three pixels will establish the color tone at a corresponding spot location in the printed record of the image. Obviously, using separate pixels to discern different color frequencies results in a reduction in resolution. Alternatively, rotary filter wheels such as is disclosed in commonly assigned U.S. Pat. No. 4,641,184, the disclosure of which is expressly incorporated by reference herein, may be used so that the individual pixels alternatively sense the basic color frequencies in the image increment seen by each pixel. Still further, and in a controlled still photography environment like that available in the formation of an identification card, the CCD 54 may be exposed to successive images of a card holder using a succession of red, green and blue flashes. In this way, the color tones of the card holder's image may be faithfully reproduced on the card 10.

Thus it will be appreciated that as a result of the present invention, a highly effective CCD pixel array or pattern is provided by which the principal objective of the invention, among others, are completely fulfilled. It will be understood by those skilled in the art that various modifications and/or changes may be made in the embodiment illustrated and described herein without depature from the invention. Accordingly, it is expressly intended that the foregoing description and accompanying drawing illustrations are illustrative of a preferred embodiment only, not limiting, and that the true spirit and scope of the present invention be determined by reference to the appended claims.

What is claimed is:

1. In a CCD pixel array for sensing an image for subsequent recording by a rotary head printer of the type which prints a series of record tracks on a print media, wherein each of the record tracks represents a curved line segment of the image, the improvement comprising:

a two-dimensional pattern of pixels defined by a plurality of spaced rows of pixels, each of said rows of pixels comprising a plurality of spaced pixels lying on a curve geometrically proportional to the curved line segment of the image to be printed.

2. In an apparatus for recording an image including a CCD having a two-dimensional array of pixels, means for presenting an image to the CCD, a rotary head laser printer for scanning a series of curved record tracks on a print media, and circuit means for transferring and processing analog voltage values generated by said pixels in response to incident image light to provide a printer scan modulating signal, the improvement comprising:

a pattern of pixels defined by a series of spaced rows of pixels, each of said rows of pixels comprising a plurality of spaced pixels lying on a curve geometrically proportional to said curved record tracks scanned by the laser printer.

* * * * *

METHOD FOR THE SIMULTANEOUS DEPICTION OF AT LEAST TWO TEMPORALLY SEQUENTIAL EVENTS ON TELEVISION, AND EQUIPMENT FOR IMPLEMENTING THIS METHOD

BACKGROUND OF THE INVENTION

The invention concerns a method for the simultaneous showing of at least two temporally sequential events. The invention also concerns equipment for implementing this method.

According to the general concept of the present invention, the method is to be used particularly for sports events that take the form of racing (for example, ski racing, bobsled racing, speed skating) and also jumping (ski jumping, broadjumping, pole vaulting). It is already known how to record temporally sequential events and to show them simultaneously on a split screen. In order to substantially synchronize the course of events shown simultaneously, one of the two image memories, which are mostly in the form of a video tape, is experimentally wound forwards and backwards until the two events can run essentially parallel next to each other at the same time. It is already possible, through a procedure of this type, to compare events that have been artificially made to be parallel by means of recording, for example ski races, and to determine, for example, in which stretch or at which gate a racer made mistakes that became apparent as loss of time.

Despite this existing possibility of comparison, the known procedure is disadvantageous, in that a really exact paralleling of the type necessary for the comparison of relatively rapid events cannot be achieved manually. The known procedure makes this possible only in retrospect, that is, after each sports event has been recorded.

The prior art as in FUNK-TECHNIK, Vol. 40 (1985), No. 10, pages 409-410, shows a television device for reproducing several video signals. Two temporally sequential events, that is, a live television program and video recordings, can simultaneously be reproduced on a picture screen. however, this prior art does not suggest showing events of a similar nature parallel or synchronously on the picture screen.

SUMMARY OF THE INVENTION

The task of the invention is to indicate a method as well as a piece of equipment that make it possible to show sports events of the type described in a more interesting and expressive way, and to create for sportspersons and managers a method of comparing individual racing or jumping events that can be provided as early and as exact as possible.

The heart of the invention lies in updating a sports event in such manner that next to the live event, which is shown as well as recorded as for instance broadcast via a television installation, a pre-recorded running or jumping event is provided in precise temporally- or spatially-parallelized representation. For example, in the case of a live ski slalom broadcast, there is an electronic parallel slalom, in which advantageously the best-time run to date is shown next to and at the same time as the live event. Viewers can measure the racers visually against the best to date, and observe how one racer "drives" more or less like the other. Differences thereupon become visible not only as temporal information but also as visual distance differences, as is also the case in a genuine live-parallel slalom. It is significant here that the human being is not able to make exact comparison solely with the help of time information. It is much easier and more agreeable for the human eye to compare optical stretches and to determine the differences, and to thereby compare the performance of two sports persons. Advantageously, the method according to the invention also offers the possibility of determining in an easy way, during the entire race and over the entire course, which of the two racers shown is actually leading. With time information, this is possible only via one or more intermediate times or after the goal has been reached. Even experienced sports reporters, after expressing opinions during the last few seconds of a ski race concerning the good form of a racer, must learn from the finishing order according to the measured running time that they were mistaken. By means of "electronic parallel running," it can easily be determined at any time, and in particular during any stretch, which racer is falling back and which racer is closing the gap and/or leading.

An inventive element of the method is that the picture storage device that constitutes the reproducer (for example a tape recorder) can be controlled by the object moving in the sports event (for example the racer or a bobsled). Only in this way can it be guaranteed that the events will really be temporally or spatially exactly parallel.

The method according to the invention can be used in races in which time is measured, but it can also be used, with certain limitations and modifications, for jumping races, particularly ski jumping, pole-vaulting, and so on. This will be clarified below by means of a ski jumping race in which the distance is determined.

In ski jumping the questions of in which phases of the descent a jumper assumes which position, how high he or she jumped, and/or which initial descent speed he achieved through optimum starting position, are of particular interest. For example, if a live jumper in the upper portion of take-off triggers a start mark that starts a preliminary recording of a jump at exactly the same spot, and then two jumpers run down the same jump hill, so that it can initially be determined who is the first to jump off the takeoff platform (a benchmark is thereby set for comparison of the take-off speed), by means of parallel representation it can then easily be analyzed which jumper is the first to reach an optimum descent position, how high he soars over the track, when he "comes down for landing," and where he leaps up. All descent phases can thereby be continuously and directly compared with one another, and thus the same advantages as in a race are achieved.

It is enlightening that a live event can be shown in parallel with an event of the same type previously stored in the picture memory. Events of the same type are those events that relate to the same type of sport, the same section and that have approximately the same motion of start-up, etc. The method according to the present invention is particularly directed to events that involve such criteria.

The characteristics of showing the events in spatially parallel form involve controlling the running speed of the picture memory in reproduction mode, for example the reproduction speed of a video tape, in for instance an accelerated or lagged manner, so that both racers are moving continuously in the electronic parallel depiction in exactly the same stretch. It is thus no longer possible to obtain information from the parallel representation about which runner is leading or behind, for example, but trainers and managers in particular have the possibility of comparing the running times of different racers at exactly the same points along the course. An electronic still device can be provided in such a manner that both the live event and the reproduced event from the past can be frozen next to each other at exactly the same place (freeze-frame operation method).

Further, according to the present invention the temporally synchronous and/or spatially parallel course is to be controlled either through markings along the path of movement or by the moving object of the sports event (this can be a racer, a jumper, or even a bobsled). Control here means that the sports event is temporally synchronized or parallelized repeatedly at several points, or that the two racers, for example, can be artificially placed next to each other at an interim-time mark in order to see which runner is leading the other at a particular point in the event, or through a number of individual marks triggered, covered, or updated in some other way by for instance the racer or the bobsled in its course. The reproducing picture memory is controlled (that is, accelerated or slowed down) as regards its reproduction speed, so that the two racers can be simultaneously seen at the same points on the picture screen(s), at the same time along the entire course exactly in parallel, even though one of the racers is travelling or has travelled much faster than the other one.

It is possible to provide patterns (bar-code patterns) along the course, which are analyzed and localized by pivoting the camera, and which are particularly suitable for transmitting signals as soon as a racer overtakes the relevant bar-code. A plurality of such bar-code patterns, distributed for instance equidistantly over the course, is thus suitable for controlling (accelerating or braking) the reproducing picture memory, in conjunction with the moving object, for the purpose of the temporal synchronization or spatial parallelizing.

The equipment according to the invention is explained in greater detail by means of an embodiment shown in the illustration.

BRIEF DESCRIPTION OF THE DRAWINGS

The illustration shows a block diagram of an embodiment of the present invention.

DESCRIPTION OF PREFERRED EMBODIMENTS

The equipment 10 depicted in the illustration shows first of all a television recording and broadcasting system, including for instance a plurality of video cameras 12-I, 12-II, 12-III connected via camera wires 14 to a production center 16, which contains a mixer 18 for mixing and separating the incoming signals. Also connected to the production center 16 is a manual input device in the form of a keyboard 20, through which alphanumerical information concerning the sports event can be superimposed on the video signal.

The production center 16 is also linked via a transfer device 22 with a number of picture memories 24-I to 24-IV in the form for instance of several tape recorders. The signal lines 26, 28 running between the picture memories 24, the transfer device 22, and the mixer 18 are constructed in such manner that they can serve as two-way lines, so that the signals can be transferred from the production center 16 to the memories 24 and back again. The purpose of the transfer device 22 is to transfer the video signals leaving the mixer 18 to one (or more) of the picture memories 24-I to 24-IV, and/or to purposefully play the signals coming from one of the picture memories 24-I to 24-IV. For this purpose, the transfer device 22 is connected with a control and selection device 30, which can be controlled purposefully either via line 32 directly from the production center 16 or via a computer/comparer 34 that controls the changeover of picture memories 24-I to 24-IV dependent on running times determined by an electronic timekeeper 36. This control proceeds in such manner that, for example, picture memory 24-I is constantly recording new runs or jumps, and picture memory 24-II continuously replays to the reproduction center 16 the current best times in effect, until this best time is cancelled out by a new (live-best time) record. Then the new best-time recorded in picture memory 24-I is reproduced in parallel to the live events that may thereafter be recorded in picture memory 24-II, until the computer/comparer 34 determines a new best-time and activates the transfer device 22. This means that not only the video signals but also the operating mode signals that establish whether the picture memories are operating in the record or reproduce mode are given to the picture memory 24-I.

It is also significant that for instance in picture memory 24-I the start signal given by the electronic timekeeper 36 is recorded as a reproduction start signal by which the relevant reproduction is started, in order to guarantee a synchronous parallel course of the live event and the recorded event. The corresponding selection of each picture memory 24-I to 24-IV is done via the computer/comparer 34 and via the control and selection equipment 30, from which a common start signal wire 38 leads to the picture memories 24-I to 24-IV.

The picture memories 24-III and 24-IV serve, for example, for simultaneous recording of partial segments of the live event, with both the video signals and also the operating mode signals for determining record or reproduce modes being conveyed to picture memories 24-III and 24-IV via the signal lines 28 in the same way as they are led to picture memories 24-I and 24-II.

A number of signal transmitters 40 that are triggered by the runners or jumpers at the start, at halfway or mid-point, or at the goal or end of the course. These signal transmitters can be a light barrier or a mechanical start barrier, in a manner that is known in and of itself.

A TV transmitter 42, a monitor 44, and an indicator panel 46 are connected with the electronic timekeeper 36. Components of this type belong to the general state of the art.

The present invention is not limited to the particular disclosed embodiments, but rather only by the scope of the claims, as would be understood by a skilled worker in the art in possession of the present disclosure.

I claim:

1. A method for the simultaneous displaying of at least two temporally sequential events of the same type on respective adjoining picture surfaces of at least one picture screen for viewer comparison therebetween, comprising storing a video signal of at least a first one of said sequential events in at least one picture memory, and storing in conjunction with said video signal at least one first-event-marker signal indicating the start of at least one respective part of said first event, and subsequently simultaneously displaying in said respective adjoining picture surfaces a second one of said sequential events and said first one of said sequential events from at least one of said at least one picture memories, by means of electronic switching procedures and use of a respective video signal of said second event and at least one respective second-event-marker signal for at least one respective part of said second event corresponding to said at least one part of said first event, wherein said simultaneously displaying of said two events of the same type in said adjoining picture surfaces of said at least one picture screen is provided so that the respective events are displayed in at least one of temporally synchronous and spatially parallel modes for said comparison of said two events, by starting the replay of said stored video signal of said first event from at least one of said at least one picture memory at respective points of said stored video signal, each said point of starting replay being determined in accordance with a respective one of said first-event-marker signals corresponding to each respective one of said at least one second-event-marker signal, as each said second-event-marker signal occurs.

2. The method of claim 1, wherein
each said event has at least one moving object therein, and
each of said temporally synchronous and spatially parallel modes is controlled by at least one of (1) said at least one moving object in each said event and (2) at least one marker object located at a respective location along a path of movement of the respective moving object in each said event, each said respective moving object and at least one marker object being used to provide each said first- and second-event-marker signal for each said event.

3. The method of claim 2, wherein
said second simultaneous displaying said first event stored in each respective one of said at least one picture memory is resynchronized simultaneously with said live performance of said second event along pre-selected segments of a course corresponding to said path of movement by means of a plurality of respective ones of each of said first- and second-event-marker signals for identifying the same respective parts of said first and second events.

4. The method of claim 1, wherein each said event involves the same course, and said stored first event is spatially re-parallelized with said second event without regard for running time of each said event, by means of multiple starts of each respective one of said at least one picture memory by use of respective pluralities of each of said first- and second-event-marker signals, each of said multiple starts of said stored video signal of said first event being from a respective location of each respective one of said at least one picture memory corresponding to a respective location along said course.

5. The method of claim 1, comprising use of a plurality of each of said first- and second-event-marker signals, wherein said at least two events being simultaneously displayed are made spatially parallel by successive adjustments of the speed of reproduction from each respective one of said at least one picture memory of each respective stored video signal of said first event, said successive adjustments being based on comparison of respective ones of said pluralities of said first- and second-marker-event signals.

6. The method of claim 2, comprising use of a plurality of said marker objects at respective locations along said path of movement for said respective moving object for each said event, wherein the reproduction speed of said displaying of said first event from each respective one of said at least one picture memory is adjusted in accordance with each said first- and second-event-marker signal corresponding to each respective marker object along said path of movement of the respective moving object, each said marking signal being established during the recording of the respective stored event in a respective position specifically allocated to the picture information in the picture memory, to be used as the respective marker signal.

7. The method of claim 4, wherein said respective picture memory locations at which the reproduction of said stored first event is restarted are pre-selected, and are identified by respective ones of said first- and second-event-marker signals corresponding to respective marker objects distributed along said course, each said marker signal being stored, when the respective event is recorded, in a respective position in at least one respective one of said at least one picture memory that is specifically allocated to such information, each said information being used to determine a respective one of said multiple starts for playing back the respective stored event for said simultaneous displaying.

8. The method of claim 6, wherein said first- and second-event markers are recorded by a recording device are evaluated by a computer system connected to the recording device, and are thereby allocated to said respective specifically allocated positions for recording in the picture information.

9. The method of claim 8, wherein said marker are bar-code patterns.

10. The method of claim 1, wherein said time synchronization for said synchronous displaying is done by at least one of (1) electrical starting signals, (2) electrical half-point signals, (3) respective ones of said marker signals that are triggered by an object scanned temporally, or (4) by a course or distance of said event, and are stored together with the picture signal of the respective event as respective recording start marks, for simultaneous display.

11. The method of claim 1, wherein said first and second events are of the same type, said stored first event is of a best-speed or broadest-distance recorded to date and said second event is a live event.

12. The method of claim 2, wherein an original temporal synchronization of said at least two events being simultaneously displayed is maintained until a time difference that can be presented on said display is determined, once an intermediate time measurement at a point along said path of movement has been measured for said at least two events.

13. An equipment for the simultaneous displaying of at least two temporally sequential events of the same type on respective adjoining picture surfaces of at least one picture screen for viewer comparison therebetween, said equipment comprising
at least one electronic device for providing each said video signal,
at least one picture screen for providing said adjoining picture surfaces,
at least two of said picture memories for the recording and playing back of the events, said second event also being recorded in a respective one of said picture memories other than the one in which said first event is stored, a control and selection device, and at least one marker switch positioned along a path of movement of each said event and connected with the control and selection device, to provide a respective electrical trigger signal thereto as a respective one of said first- or second-eventmarker signals when activated by an object moving along said path of movement during each respective event, wherein said at least two picture memories are started upon the occurrence of respective ones of said trigger signal, a first of said picture memories being switched to playback-operating mode to play back said first event previously recorded, said second event being a live event that is read into a second of said picture memories in recording mode, and a respective marker signal corresponding to each said electrical trigger signal is stored at a respective position in said second picture memory.

14. The equipment according to claim 13, wherein each said marker switch is constructed as a light barrier or a mechanical barrier, through which barrier said object moves during the event.

15. The equipment of claim 13, wherein each said marker signal corresponding to the activation of each said marker switch is recorded as a bar-code pattern in the respective picture memory, said equipment further comprising an electronic recording device constructed as a video camera for scanning each said bar-code pattern and a calculator to which a signal is sent from said electronic recording device corresponding to each said scanned bar-code pattern, said calculator sending a corresponding starting impulse to said control and selection device.

16. The equipment of claim 13, comprising an electrical timekeeping device having an automatic time-comparison device, wherein the control and selection device is connected with an output of the time-comparison device in such manner that said first picture memory with said previouslyrecorded first event and said second picture memory with said just-recorded second event retain their contents until said time comparison device determines that said second event is a better time than said first event, whereupon the respective operating modes of the picture memories are reversed for the recording and simultaneous playback for the next live event.

17. The equipment of claim 13, wherein after an event has been played back said control and selection device automatically returns or rewinds the picture memory to the storage point indicated by the respective marker signal.

18. The equipment of claim 13, wherein an input coding device is connected with said control and selection device, and in recording mode alpha-numerical information concerning the event is selectively input through said input coding device for recording together with the picture information.

19. The equipment of claim 13, comprising a further memory and a freeze-frame device that can be operated to selectively temporarily store in said further memory the two parallel pictures for freeze-frame creation, and to halt the operation of the two picture memories as a freeze-frame.

20. The method of claim 1, comprising employing a plurality of said picture memories, and recording said second event in a respective further one of said picture memories simultaneously with said display thereof in the respective adjoining picture surfaces.

* * * * *